United States Patent
Duchatel et al.

(10) Patent No.: US 10,241,533 B2
(45) Date of Patent: Mar. 26, 2019

(54) METHOD FOR REGULATING THE POWER CONSUMED ON AN ELECTRIC POWER GRID AND CONTROL ENTITY OF THE CONSUMPTION ON THIS ELECTRIC POWER GRID

(71) Applicant: ENERGY POOL DEVELOPPEMENT, Le Bourget du Lac (FR)

(72) Inventors: Jean-Pierre Duchatel, Lyons (FR); Stephanie Petit Halajda, Lyons (FR)

(73) Assignee: ENERGY POOL DEVELOPPEMENT SAS, Le Bourget du Lac (FR)

( * ) Notice: Subject to any disclaimer, the term of this patent is extended or adjusted under 35 U.S.C. 154(b) by 1133 days.

(21) Appl. No.: 14/477,039

(22) Filed: Sep. 4, 2014

(65) Prior Publication Data

US 2015/0073617 A1 Mar. 12, 2015

(30) Foreign Application Priority Data

Sep. 6, 2013 (FR) ..................... 13 58569

(51) Int. Cl.
*G05F 1/66* (2006.01)
*G05B 15/02* (2006.01)
*H02J 3/14* (2006.01)

(52) U.S. Cl.
CPC ............ *G05F 1/66* (2013.01); *G05B 15/02* (2013.01); *H02J 3/14* (2013.01); *Y02B 70/3225* (2013.01); *Y04S 20/222* (2013.01)

(58) Field of Classification Search
None
See application file for complete search history.

(56) References Cited

U.S. PATENT DOCUMENTS 6,487,509 B1 11/2002 Aisa
6,493,643 B1 12/2002 Aisa
(Continued)

FOREIGN PATENT DOCUMENTS

EP 1 372 238 A1 12/2003
FR 2 937 473 A1 4/2010

OTHER PUBLICATIONS

French Preliminary Search Report dated Jun. 12, 2014 in French Application 13 58569, filed on Sep. 6, 2013 ( with English Translation of categories of Cited Documents).

*Primary Examiner* — Van H Nguyen
(74) *Attorney, Agent, or Firm* — Oblon, McClelland, Maier & Neustadt, L.L.P.

(57) ABSTRACT

According to the inventive method, the power consumed on an electric grid (10), by preselected consumers (42, 44, 46, 48, 50, 52) being able to accept a predetermined decrease in power over a predetermined time range, is regulated. This method comprises the following successive steps: sending a control entity, regularly and by each preselected consumer (42, 44, 46, 48, 50, 52), a message (M1) containing the power consumed by said preselected consumer (42, 44, 46, 48, 50, 52); using the control entity (60) to compute a maximum power reduction value for all of the preselected consumers (42, 44, 46, 48, 50, 52) and a maximum duration of that power reduction; transmitting, using the control entity (60) and to a grid manager (62), computed values and maximum power durations; and sending, from the grid manager (62) to the control entity (60), a command order (79) commanding a power reduction for a selected duration.

17 Claims, 2 Drawing Sheets

(56) References Cited

U.S. PATENT DOCUMENTS

| | | | | |
|---|---|---|---|---|
| 8,504,215 B1 * | 8/2013 | McCorkendale | ....... | H02J 3/005 700/291 |
| 8,588,991 B1 * | 11/2013 | Forbes, Jr. | ............. | G05B 19/02 700/286 |
| 8,761,952 B2 * | 6/2014 | Forbes, Jr. | ............. | G05B 19/02 340/870.02 |
| 8,806,239 B2 * | 8/2014 | Forbes, Jr. | ............. | G01D 4/004 700/22 |
| 9,088,179 B2 * | 7/2015 | Shaffer | ..................... | H02J 3/14 |
| 9,513,648 B2 * | 12/2016 | Forbes, Jr. | ............. | G05B 19/02 |
| 2003/0233201 A1 | 12/2003 | Horst et al. | | |
| 2014/0039699 A1 * | 2/2014 | Forbes, Jr. | ............. | G05B 19/02 700/286 |

* cited by examiner

METHOD FOR REGULATING THE POWER CONSUMED ON AN ELECTRIC POWER GRID AND CONTROL ENTITY OF THE CONSUMPTION ON THIS ELECTRIC POWER GRID

BACKGROUND OF THE INVENTION

The present invention relates to a method for regulating the power consumed on an electric grid and an entity for controlling the consumption of a plurality of preselected electric current consumers on the electric grid.

In light of the economic and technical difficulties of storing large quantities of electricity, it is necessary to maintain a continuous equilibrium between the consumption and production of electricity on the electric grid. In order to guarantee that the supply is adapted to the demand at any given time, rigorous and continuous management of the consumption loads and production programs is crucial: this is the primary stake in managing the grid. The use of intermittent production means of the renewable energy type (wind, solar) and the heat sensitivity of certain uses (electric heating, air conditioning) reinforce the criticality of this management of the balance between production and consumption during certain periods of the year and/or certain times of day.

In order to regulate consumption and production, and respond to a quick variation in supply or demand, the entity responsible for managing the grid, also called grid manager, has power reserves that can be mobilized. There are three types of power reserves that can be mobilized: a primary reserve, a secondary reserve, and a tertiary reserve.

It is important to note that what is described as a power reserve above and hereinafter does not correspond to an energy store, but to additional production capacities of certain electricity producing sites or consumption decrease capacities provided by a reduction in the power consumed by certain electricity consumers, which can be implemented if needed.

The primary reserve is the power reserve with the shortest response time, i.e., less than 30 seconds. It is activated automatically and continuously based on the variation in the frequency of the grid. The production groups or electricity consumption sites participating in this reserve adapt their supplied/consumed power based on the deviation between the frequency of the grid and a reference frequency, for example equal to 50 Hz for France.

The secondary reserve is globally similar to the primary reserve, but can be activated in a larger length of time, in the vicinity of several minutes. The secondary reserve, which is also automatic, acts after the primary reserve and is intended to reestablish the frequency of the grid at the reference frequency. It is managed in a centralized manner by the entity responsible for managing the grid.

Lastly, the tertiary reserve comes into play when the available secondary reserve is insufficient. Unlike the primary and secondary reserves, which are automated, the tertiary reserve is implemented manually by the entity responsible for managing the grid in a time frame generally shorter than 15 minutes.

It thus appears that the grid integrates excess electricity production capacities that are either implemented only during high consumption and high demand periods for electricity, or mobilized in the form of available power reserves at any time to ensure the equilibrium of the grid, i.e., for example, an electricity producing site limits its electricity production in order to be able to provide a power reserve at any time. The mobilization of these excess capacities creates significant costs for the producer and the distributor. That is why different solutions have already been proposed to reduce the power consumed by certain consumers.

FR-A-2,937,473 thus describes an entity for regulating the electricity consumption on the grid, that entity performing a series of individual actions on different preselected consumers, based on parameters transmitted by the preselected consumers, such as the maximum acceptable value for the power reduction.

Furthermore, at this time and in the majority of countries throughout the world, the participation in the different reserves described above is primarily done by electricity producers. In order to vitalize the market for different reserves, and to promote environmental protection, it may be interesting to promote consumer participation in the different reserves. Thus, by reducing or modifying their consumption in accordance with the instructions from the entities responsible for managing the grid, consumers can contribute to the aforementioned reserves and thus compete with or replace the offers by electricity producers.

However, the participation in most of the reserves, and in particular primary or even secondary reserves, has proven difficult and expensive for consumers to implement inasmuch as it implies a very short reaction time by the entity providing the reserves.

SUMMARY OF THE INVENTION

The invention more particularly aims to resolve these drawbacks by proposing a control entity and a method for regulating the power consumed on an electric grid making it possible to reduce the power consumed by certain consumers quickly, reliably and cost-effectively.

To that end, the invention relates to a method for regulating the power consumed on an electric grid, the electric grid being able to supply a plurality of consumers with electric current, preselected consumers being able to accept a predetermined decrease in power over a predetermined time range. According to the invention, the method comprises the following steps:

the transmission to a control entity, regularly and by each preselected consumer, of a message containing the consumed power of said preselected consumer, the duration between two successive message transmissions for a given consumer being less than 1 hour, preferably less than 10 minutes, still more preferably less than 1 minute, the computation, by the control entity, of a maximum power reduction value for all of the preselected consumers and a maximum duration of that power reduction, said maximum value being computed based on the received consumed power values for each preselected consumer, the transmission, by the control entity and to a grid manager, of the maximum value and duration for the computed power reductions, the sending, by the grid manager to the control entity, of a command order for a power reduction for a selected length of time, the value of the commanded power reduction being less than or equal to the maximum computed power reduction value and the selected duration being less than or equal to the maximum computed power reduction duration.

According to advantageous aspects of the invention, the method for regulating the power consumed on an electric grid further comprises one or more of the following features, considered alone or according to technically allowable combinations:

the control entity is separate from the grid manager, the control entity preferably being capable of communicating with the grid manager via the Internet;

during the computation step, the control entity computes a minimum power reduction duration and during the transmission step, said minimum duration is sent to the grid manager, whereas during the sending step, the selected duration is comprised between the computed minimum and maximum durations of the power reduction;

during the transmission step, the transmitted consumed power is an instantaneous or averaged power;

the command order for the power reduction is carried out by the control entity as of receipt of that order, whereas the time frame between the sending of the order and the power reduction for the preselected consumers is less than 1 minute, preferably less than 30 seconds, still more preferably less than 5 seconds;

the electric grid is capable of powering a plurality of distinct geographic zones, and the preselected consumers are grouped together by geographic zone, whereas, during the computation step, the maximum power reduction value and duration are computed for each of the geographic zones and, during the step for sending the command order, the power reduction command order is specific to one or more geographic zones;

during the computation step, the control entity carries out the following steps:
  a) processing the messages transmitted by each preselected consumer,
  b) verifying that the power reduction offered by the preselected consumers is greater than or equal to a predetermined power reduction value for each geographic zone,
  c) activating an alert signal on a terminal of the control entity and increasing the number of preselected consumers for a given geographic zone if the power reduction offered by the consumers previously preselected for said geographic zone is less than the predetermined power reduction value, then returning to the verification step,
  d) generating a decision file comprising the computed maximum power reduction value and duration;

during the processing of the messages transmitted by each preselected consumer, the control entity computes, for each preselected consumer, the power reduction and the duration of that power reduction, based on the consumed power value and the following parameters:
  the value of the predetermined power decrease,
  the maximum number of power reductions authorized over a predetermined time period,
  the number of power reductions done since the beginning of a predetermined time period,
  the minimum time frame between two successive power reductions,
  the predetermined time range for the power reduction,
  the minimum time frame for implementing the power reduction,
  the consumer's availability schedule;

each preselected consumer comprises one or more sub-consumers whereas, during the transmission step, the consumed power transmitted, via the message, by each preselected consumer is equal to the sum of the powers consumed by the corresponding sub-consumers, and the message also comprises the power consumed by each sub-consumer;

during the computation step, the control entity computes, for each preselected consumer, several power reduction values during a maximum duration, the computed values being equal to respective percentages of the maximum power reduction value and corresponding to power reductions consumed by each sub-consumer or groups of sub-consumers, whereas during the transmission step, the control entity transmits the different computed power reduction values and the corresponding maximum durations, and during the sending step, the value of the commanded power reduction is equal to one of the values transmitted by the control entity;

during the computation step, the time frame to compute the maximum power reduction value and duration, as of the reception of the consumed powers, transmitted by each preselected consumer, is less than 1 minute;

during the computation step, the computed maximum power reduction values and durations are anticipated values and durations, whereas the anticipated values and durations are transmitted to the grid manager daily and correspond to the forecasts, for a predetermined period, preferably for the following day, of the maximum power reduction values and for a maximum length of time.

The invention also relates to a control entity for controlling the consumption of a plurality of preselected consumers of electric current in an electric grid, the electric grid being able to power a plurality of consumers, the preselected consumers being able to accept a predetermined power decrease over a predetermined time range. According to the invention, the control entity comprises:

means for receiving a message containing the power consumed by a preselected consumer, each preselected consumer being able to transmit said message to the control entity regularly, the duration between two successive message transmissions for a given consumer being less than 1 hour, preferably less than 10 minutes, still more preferably less than 1 minute, a member for computing a maximum power reduction value for all of the preselected consumers and for maximum length of time, said maximum value being computed as a function of the received power values consumed for each preselected consumer, means for sending a grid manager computed maximum power reduction values and durations, means for receiving an order commanding a power reduction for the preselected consumers for a selected duration, the value of the commanded power reduction being less than or equal to the maximum computed power reduction value and the selected duration being less than or equal to the computed maximum power reduction duration, the command order being sent by the grid manager.

Owing to the invention, the control entity makes it possible to guarantee the grid manager a power reserve, in the form of a power reduction, available quickly. Furthermore, the grid manager is not required perform any computation, and is therefore able to activate that power reserve very quickly during a sudden increase in consumption or decrease in production on the grid.

Additionally, the power reduction is computed relative to an actual consumption, which makes it possible to guarantee a power reduction value and optimize the costs related to that power reduction.

Lastly, the power reduction is preferably targeted, since the preselected consumers are for example distributed in geographic zones, and during the power reduction, the grid manager selects a given geographic zone.

BRIEF DESCRIPTION OF THE DRAWINGS

The invention will be better understood, and other advantages thereof will appear, in light of the following description, provided solely as a non-limiting example, and done in reference to the appended drawings, in which.

DETAILED DESCRIPTION OF THE INVENTION

Figure 1:
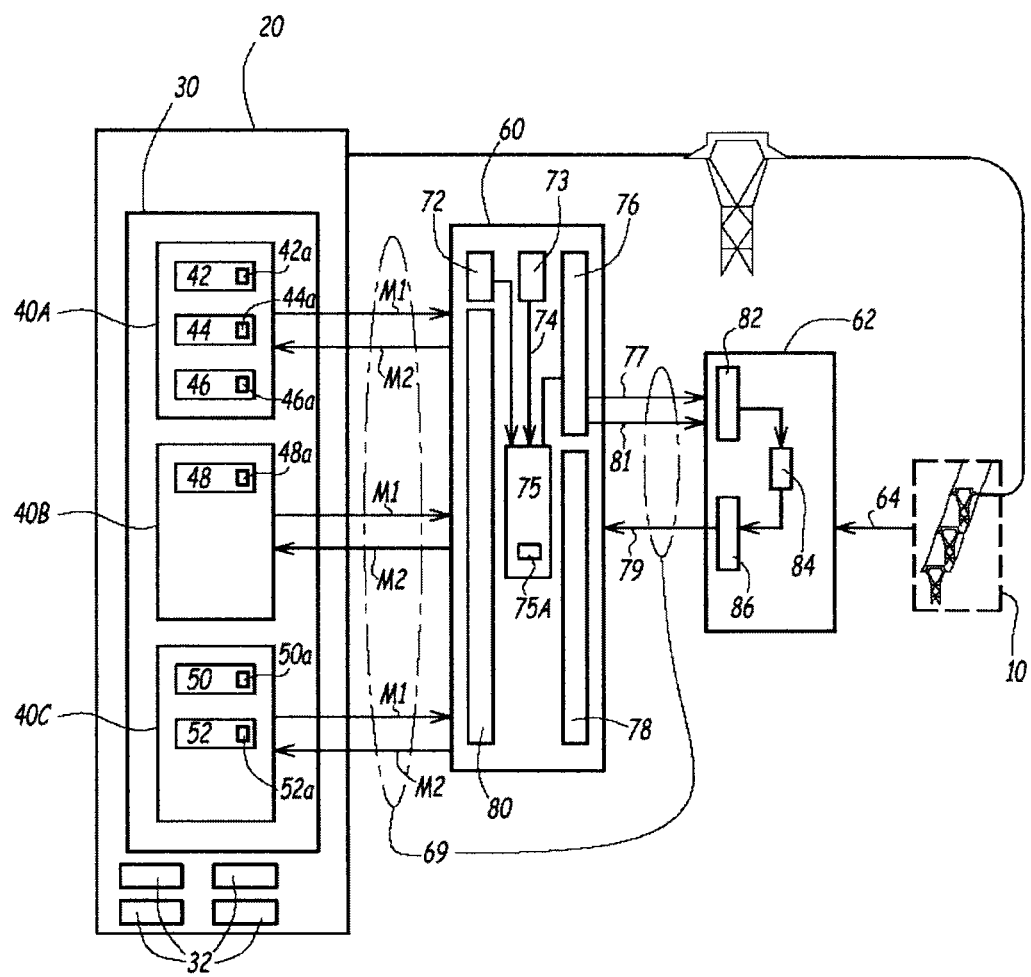
FIG. 1 is a diagrammatic illustration of a grid supplying different consumers, a grid manager and a control entity making it possible to regulate the consumption on the grid.
Figure 2:
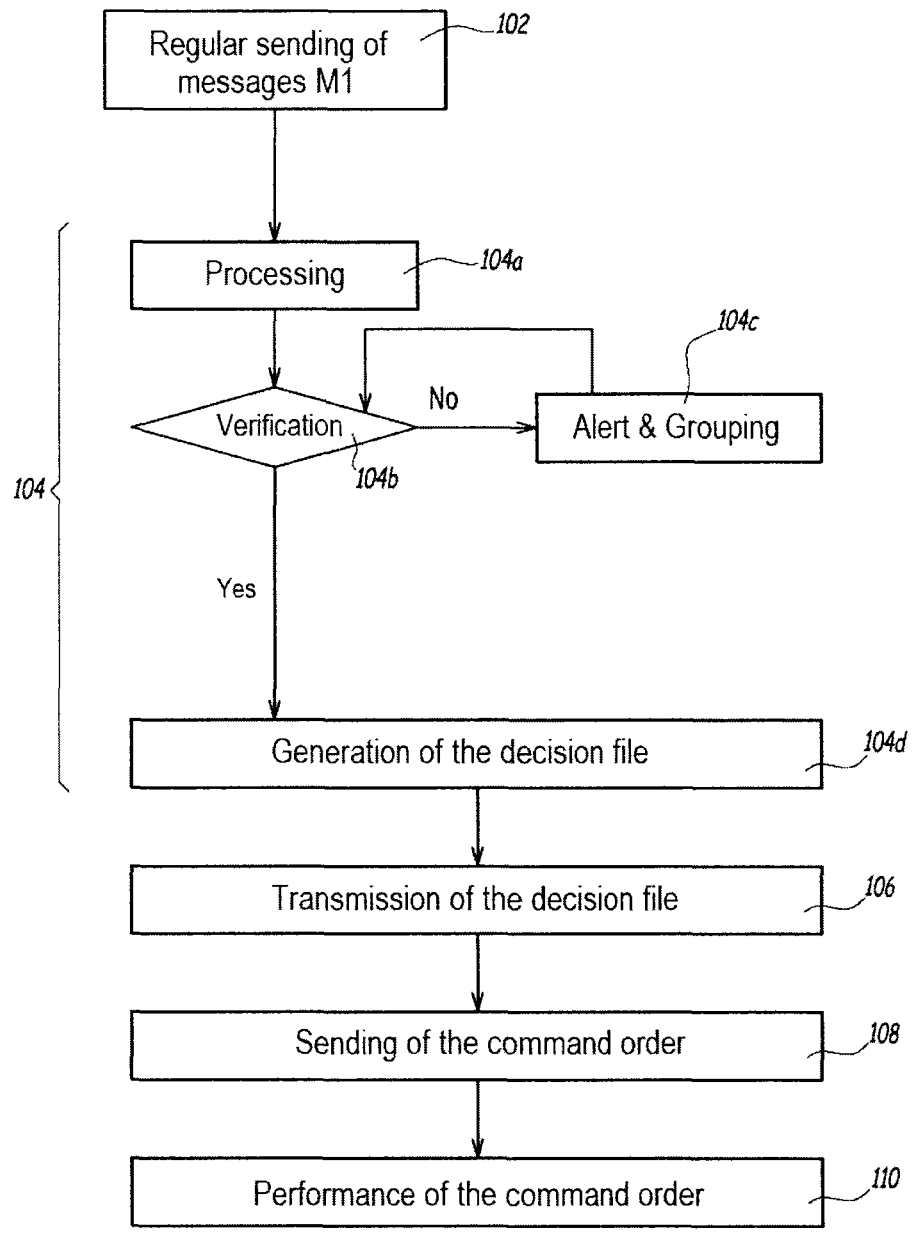
FIG. 2 is a flowchart of the steps of a method for regulating the power consumed on an electric grid according to the invention.

In FIG. 1, an electric grid 10 is capable of powering a set 20 of electric current consumers. This set 20 of consumers comprises a subset 30 of preselected consumers able to accept a predetermined power decrease over a predetermined time range, and other consumers 32. The subset 30 of preselected consumers is for example distributed between the first, second and third geographic zones respectively denoted 40A, 40B and 40C. The first geographic zone 40A comprises three preselected consumers 42, 44, 46, the second geographic zone 40B comprises one preselected consumer 48, and the third geographic zone 40C comprises to preselected consumers 50, 52.

Each preselected consumer 42, 44, 46, 48, 50, 52 comprises a control member respectively denoted 42*a*, 44*a*, 46*a*, 48*a*, 50*a*, 52*a*. The preselected consumers 42, 44, 46, 48, 50, 52 of each geographic zone 40A, 40B, 40C are connected to a control entity 60 by means of the control member 42*a*, 44, 46*a*, 48*a*, 50*a*, 52*a*. The communication between the control member 42*a*, 44, 46*a*, 48*a*, 50*a*, 52*a* and the control entity 60 is provided by a secure connection of the virtual private network (VPN) type, assisted by the Internet 69.

Each preselected consumer 42, 44, 46, 48, 50, 52 is able to accept a predetermined power decrease, over the predetermined time range. The predetermined power decrease and the predetermined time range are defined by agreement between the control entity 60 and the preselected consumers 42, 44, 46, 48, 50, 52.

Each preselected consumer 42, 44, 46, 48, 50, 52 sends the control entity 60 a message M1 containing the instantaneous or averaged consumed powers of said preselected consumer owing to its control member 42*a*, 44, 46*a*, 48*a*, 50*a*, 52*a*. Additionally, the control member 42*a*, 44, 46*a*, 48*a*, 50*a*, 52*a* also makes it possible to send the control entity 60 information, by means of the message M1, on any anticipated or unexpected unavailability and the non-acceptance of a power reduction.

Also additionally, each preselected consumer 42, 44, 46, 48, 50, 52 comprises one or more sub-consumers, not shown in the various figures. The power consumed by each preselected consumer 42, 44, 46, 48, 50, 52 is equal to the sum of the powers consumed by the corresponding sub-consumers and is transmitted via the message M1. Also additionally, the message M1 comprises the power consumed by each sub-consumer.

The control entity 60 is directly connected to a grid manager 62, also called regulating entity, ensuring the transport and/or distribution of electricity and the management of the grid 10, or only the management of the grid 10. The grid manager 62 receives information 64 from the grid 10 relative to the consumption on the grid 10 and the production capacity on the grid 10. This information 64 is expressed in different ways based in particular on the type of grid.

The control entity 60 comprises first means 72 for receiving the message M1, and means 73 for storing operating parameters 74, the operating parameters 74 being specific to each preselected consumer 42, 44, 46, 48, 50, 52.

The control entity 60 comprises a computation member 75, means 76 for transmitting a decision file 77 and second means 78 for receiving and carrying out a command order 79 to reduce the power of each preselected consumer 42, 44, 46, 48, 50, 52, for a selected duration. Furthermore, the control entity 60 comprises means 80 for displaying alert signals and results of the computations done by the computation member 75.

The grid manager 62 comprises means 82 for receiving the decision file 77, a processing member 84 and second means 86 for transmitting the command order 79.

The first receiving means 72 are capable of recovering the messages M1, and more particularly, the instantaneous or averaged consumed power values for each preselected consumer 42, 44, 46, 48, 50, 52.

The storage means 73 are able to store the operating parameters 74, which are known from the control entity 60, for example following a contract entered into between the control entity 60 and each preselected consumer 42, 44, 46, 48, 50, 52. For each preselected consumer 42, 44, 46, 48, 50, 52, the operating parameters 74 comprise:
- the value of the predetermined power decrease, or additionally criteria for computing the predetermined power decrease value based on the consumed power,
- a maximum number of authorized power reductions over a predetermined time period,
- a number of power reductions done since the beginning of a predetermined time period,
- a minimum time frame between two successive power reductions,
- the predetermined time range of the power reduction or, additionally, predetermined minimum and maximum durations of the power reduction,
- a minimum time frame for implementation of the power reduction,
- an availability schedule for the power reduction.

Additionally, each preselected consumer 42, 44, 46, 48, 50, 52 makes its available power offers subject to financial compensation known by the control entity 60.

The computation member 75 is capable of computing a maximum power reduction value for the set 30 of preselected consumers and minimum and maximum durations of that power reduction. These computations are done based on operating parameters 74 recorded by the storage means 73 and instantaneous consumed powers sent via each message M1. The computation member 75 comprises a processing member 75A capable of processing the operating parameters 74 in order to perform the power reduction and maximum and minimum duration computations. Additionally, the processing member 75A is capable of verifying that the power reduction offered by the preselected consumers is, for each geographic zone 40A, 40B, 40C or for all of the preselected consumers 30, greater than or equal to a value, predetermined by the control entity 60, for the power reduction. In the event the processing member 75A detects, during verification, that the power reduction offered by the preselected consumers is below the predetermined value, the processing member 75A is capable of emitting an alert on display means 80 of the control entity 60. It is also able to group together a larger number of preselected consumers 42, 44, 46, 48, 50, 52 in order to increase the available power reduction. The computation member 75 is lastly able to generate the decision file 77 comprising the maximum value and the minimum and maximum computed power reduction durations.

Subsequently, transmission means 76 are able to send the decision file 77 to the grid manager 62.

The second receiving means 78 are capable of receiving the command order 79 for a reduction in the consumed power, during a selected length of time, and carrying it out. In order to carry it out, the second receiving means 78 are able to send a command message M2 to the control members 42a, 44, 46a, 48a, 50a, 52a, which are able to reduce the power of the preselected consumers 42, 44, 46, 48, 50, 52.

The third receiving means 82 of the grid manager 62 are able to receive the decision file 77 and send it to the processing unit 84.

The unit 84 is able to recover the maximum value and minimum and maximum durations of the power reduction, and to select a power reduction value for a selected length of time. Additionally, the power reduction is specific to one or more geographic zones 40A, 40B, 40C.

The transmission means 86 [are] able to transmit the selected value to the control entity 60 in the form of the command order 79.

The control entity 60 and the grid manager 62 are connected by the Internet 69. The transmission means 76, 86 and the receiving means 72, 78, 82 are, for example, Ethernet routers.

Alternatively or additionally, the transmission and receiving means are wireless means and include wireless antennas, or any other remote communication means.

The control entity 60 and the grid manager 62 are separated by at least 100 m, preferably at least 1 km, and more generally several tens of kilometers. The control entity 60 and the grid manager 62 are two separate entities based in different locations, and have different functions. The control entity 60 communicates only with the preselected consumers 42, 44, 46, 48, 50, 52, while the grid manager 62 manages all of the grid 10 and consumers 20.

Alternatively, the control entity 60 and the grid manager 62 form a single entity.

The power reduction values for a given duration are computed by the control entity 60, and are available at the grid manager 62, for example on a web portal, or via a computer file, and a program decides to send the command order 79 for the power reduction.

Furthermore, the geographic zones 40A, 40B, 40C are defined by mutual agreement between the control entity and the grid manager 62.

Thus, during the method for regulating the power consumed on an electric grid, a first step consists of regularly sending 102 the message M1 to the control entity 60, by each preselected consumer 42, 44, 46, 48, 50, 52. The duration between two successive message emissions for a given consumer is less than 1 hour, preferably less than 10 minutes, and still more preferably less than 1 minute.

During a second computation step 104, the control entity next computes a maximum power reduction value for all of the preselected consumers 42, 44, 46, 48, 50, 52 and the minimum and maximum durations of that power reduction.

Additionally, during the computation step 104, the control entity computes several power reduction values and the minimum and maximum durations of the corresponding power reduction.

The computed values are for example equal to percentages of the maximum power reduction value. Furthermore, in the alternative where each preselected consumer 42, 44, 46, 48, 50, 52 comprises sub-consumers, the computed power reduction values for example correspond to power reductions consumed by each sub-consumer or groups of sub-consumers.

The number of values computed is defined by mutual agreement between the control entity 60 and the grid manager 62. These values correspond to different scenarios and needs for a reduction in the power consumed overall on the entire grid 10 or by geographic zone.

The computation step 104 is broken down into different steps:
- a step 104a for processing messages emitted by each preselected consumer 42, 44, 46, 48, 50, 52. During the processing step 104a, the operating parameters 74 are processed so as to perform the computations of the maximum value and minimum and maximum durations of the power reduction,
- a step 104b for verifying that the power reduction offered by the preselected consumers 42, 44, 46, 48, 50, 52 is, for each geographic zone 40A, 40B, 40C, greater than or equal to a predetermined power reduction value,
- a step 104c for activating an alert signal on the display means 80, and grouping 104c more preselected consumers 42, 44, 46, 48, 50, 52 together for a given geographic zone 40A, 40B, 40C, in the event the power reduction offered by the previously preselected consumers 42, 44, 46, 48, 50, 52, for said geographic zone, or for all of the geographic zones, is below the predetermined power reduction value. After the activation step 104c, one returns to the verification step 104b,
- a step 104d for generating the decision file 77 comprising the computed maximum value and minimum and maximum durations of the power reduction.

At the end of step 104a, the first message M1 has been processed such that the result of the processing assumes, in a diagrammatic and partial illustration, the following form, in the event only the preselected consumers 42, 44, 46 of the first geographic zone 40A are considered:

| Consumer | Reduction capacity | Available power | |
|---|---|---|---|
| 42 | CE1 | Available power (MW) | 10 |
|    |     | €/MWh | 130 |
|    | CE2 | Available power (MW) | 20 |
|    |     | €/MWh | 200 |
| 44 | CE1 | Available power (MW) | 20 |
|    |     | €/MWh | 160 |
|    | CE2 | Available power (MW) | 0 |
|    |     | €/MWh |  |
| 46 | CE1 | Available power (MW) | 20 |
|    |     | €/MWh | 190 |
|    | CE2 | Available power (MW) | 20 |
|    |     | €/MWh | 140 |
|    | CE3 | Available power (MW) | 10 |
|    |     | €/MWh | 130 |
| TOTAL | | Available power (MW) | 100 |
|    |     | €/MWh | 164 |

The preselected consumers 42, 44, 46 for example distribute their consumption over several offered power reductions, also called reduction capacities and denoted CE1, CE2, CE3. The reduction capacities CE1, CE2, CE3 for example correspond to the sub-consumers previously described and are specific to each of the preselected consumers 42, 44, 46. Each reduction capacity CE1, CE2, CE3 for example corresponds to a building or an electric machine comprised by the preselected consumer 42, 44, 46, that building or that machine being able to accept a power reduction. Thus, the maximum power reduction offered by a preselected consumer 42, 44, 46 corresponds to the sum of its reduction capacities CE1, CE2, CE3. Each reduction capacity CE1, CE2, CE3 is associated with available power, i.e., a possible power reduction. Additionally, a cost is associated with each power reduction.

Furthermore, during the generating step 104d, the decision file 77 comprises several power reduction values during a maximum duration, those different values corresponding to different scenarios and needs for a reduction in the power globally consumed on the grid 10. The values comprised in the decision file 77 are equal to percentages of the maximum power reduction value or a group of reduction capacities, i.e., sub-consumers. The decision file 77 also comprises the cost per megawatt hour (MWh) corresponding to each power reduction value.

During step 104c, grouping a larger number of consumers together makes it possible to guarantee an available power reduction level to the control entity.

The following step 106 consists of the transmission of the decision file 77 by the control entity 60 to the grid manager 62.

The decision file 77 assumes, in a diagrammatic partial illustration, the following form:

|  |  | Low scenario | Medium scenario | High scenario |
| --- | --- | --- | --- | --- |
| Global | Available power (MW) | 94 | 122 | 183 |
|  | €/MWh | 126 | 131 | 150 |
| Zone 40A | Available power (MW) | 40 | 60 | 100 |
|  | €/MWh | 135 | 143 | 164 |
| Zone 40B | Available power (MW) | 15 | 23 | 23 |
|  | €/MWh | 105 | 110 | 110 |
| Zone 40C | Available power (MW) | 39 | 39 | 60 |
|  | €/MWh | 125 | 125 | 141 |

The different scenarios correspond to the additional aspect where the decision file 77 comprises several power reduction values. In the example of the table above, three scenarios can be considered, i.e., a low scenario, a medium scenario and a high scenario. Each scenario is broken down into several geographic zones 40A, 40B, 40C, and each zone is associated with a power reduction, here called available power, and a cost. The high scenario corresponds to the greatest power reduction, i.e., generally the maximum power reduction.

After the transmission step 106, a sending step 108 consists of the grid manager 62 sending the command order 79. The commanded power reduction value is less than or equal to the maximum value of the computed power reduction, and the duration of the selected power reduction is comprised between the computed minimum and maximum power reduction durations. The command order 79 corresponds to one of the computed and proposed scenarios. Additionally, each scenario is associated with the computed minimum and maximum reduction durations.

Then, the regulating method includes a step 110 for carrying out the command order 79 by the control entity 60. The command order 79 is carried out by the control entity 60 upon reception of that order. More specifically, the time frame between the sending of the command order 79 and the reduction of the power for the preselected consumers 42, 44, 46, 48, 50, 52 is less than 1 minute, preferably less than 30 s, still more preferably less than 5 seconds. It is thus considered that the regulation is done quasi-automatically, since it is done in a very short time frame. In order to perform this power reduction, the second reception means 78 send the message M2 to the control members 42a, 44a, 46a, 48a, 50a, 52a, which are able to reduce the power of the preselected consumers 42, 44, 46, 48, 50, 52.

Furthermore, considering the different reserve levels previously presented, the power reduction offered by the preselected consumers 42, 44, 46, 48, 50, 52 for example corresponds to a primary or secondary reserve, since it can be activated in a very short length of time.

Alternatively, the time frame between the sending of the command order 79 and the reduction of the power of the preselected consumers 42, 44, 46, 48, 50, 52 is less than 10 minutes.

In the event the decision file 77 comprises several scenarios, during the performance of the command order 79, the control entity 60 reduces the power of all of the preselected consumers 42, 44, 46, 48, 50, 52, so that that value is equal to the value transmitted during sending of the command order 79 by the grid manager 62. More specifically, during the computation of a power reduction for a geographic zone 40A, 40B, 40C, the control entity 60 chooses a certain number of consumers, depending on the considered scenario, from among the preselected consumers 42, 44, 46, 48, 50, 52, in order to obtain the desired power reduction for the scenario. Thus, during the reception of the command order 79, corresponding to a scenario chosen by the grid manager 62, then its performance, only the consumers chosen during the computation step specific to the scenario selected by the grid manager 62 will experience a power reduction.

Furthermore, since the preselected consumers 42, 44, 46, 48, 50, 52 are grouped by geographic zone 40A, 40B, 40C, the power reduction values and duration of that reduction are computed for each of the geographic zones 40A, 40B, 40C during the computation step 104. Thus, during the step 108 for sending the command order 79, the command order 79 of the power reduction is specific to one or more geographic zones 40A, 40B, 40C.

Furthermore, during the computation step 104, the time frame to compute the maximum power reduction value and minimum and maximum durations, as of receipt of the instantaneous or averaged consumed power, i.e., as of reception of the messages M1, is less than 1 minute. More specifically, in that case, the power reduction values and the duration of those power reductions are considered to be real-time values corresponding to a power reduction considered to be a real-time value.

Alternatively, during the computation step 104, anticipated maximum power reduction values and minimum and maximum durations can be computed and transmitted to the grid manager 62 each day. These values correspond to the forecasts, for the following day for example, or more generally for a predetermined period, of the maximum power durations and the minimum and maximum durations of that power reduction. In this alternative, after step 104a, the first message M1 has been processed such that the result of the processing assumes, in a diagrammatic and partial illustration, the following form, in the event only the preselected consumers 42, 44, 46 of the first geographic zone 40A are considered:

|  | Reduction capacity | Available power | Time bracket | | | | | | | | | | | |
|---|---|---|---|---|---|---|---|---|---|---|---|---|---|---|
| Consumer | | | 0 h-2 h | 2 h-4 h | 4 h-6 h | 6 h-8 h | 8 h-10 h | 10 h-12 h | 12 h-14 h | 14 h-16 h | 16 h-18 h | 18 h-20 h | 20 h-22 h | 22 h-24 h |
| 42 | CE1 | Available power (MW) | 0 | 0 | 0 | 0 | 10 | 10 | 10 | 10 | 0 | 0 | 0 | 0 |
|  |  | €/MWh |  |  |  |  | 180 | 180 | 180 | 180 |  |  |  |  |
|  | CE2 | Available power (MW) | 20 | 20 | 20 | 20 | 20 | 20 | 20 | 20 | 20 | 20 | 20 | 20 |
|  |  | €/MWh | 200 | 200 | 200 | 200 | 200 | 200 | 200 | 200 | 200 | 200 | 200 | 200 |
| 44 | CE1 | Available power (MW) | 20 | 20 | 20 | 20 | 20 | 20 | 20 | 20 | 20 |  |  |  |
|  |  | €/MWh | 160 | 160 | 160 | 160 | 160 | 160 | 160 | 160 | 160 |  |  |  |
|  | CE2 | Available power (MW) |  |  |  |  |  |  | 30 | 30 | 30 | 30 | 30 | 30 |
|  |  | €/MWh |  |  |  |  |  |  | 150 | 150 | 150 | 150 | 150 | 150 |
| 46 | CE1 | Available power (MW) | 30 | 30 | 30 | 30 | 20 | 20 | 20 | 20 | 20 | 30 | 30 | 30 |
|  |  | €/MWh | 190 | 190 | 190 | 190 | 190 | 190 | 190 | 190 | 190 | 190 | 190 | 190 |
|  | CE2 | Available power (MW) |  |  |  | 20 | 20 | 20 | 20 | 20 | 20 | 20 |  |  |
|  |  | €/MWh |  |  |  | 140 | 140 | 140 | 140 | 140 | 140 | 140 |  |  |
|  | CE3 | Available power (MW) |  |  |  | 10 | 10 | 12 | 12 | 10 | 10 | 10 | 10 | 10 |
|  |  | €/MWh |  |  |  | 165 | 165 | 130 | 130 | 130 | 130 | 130 | 130 | 130 |
| TOTAL |  | Available power (MW) | 70 | 70 | 70 | 100 | 100 | 102 | 132 | 130 | 120 | 110 | 90 | 90 |
|  |  | €/MWh | 184 | 184 | 184 | 174 | 173 | 168 | 164 | 165 | 163 | 166 | 172 | 172 |

The table above is similar to that previously shown for the result of the processing in the case where the real-time values are considered, but in this case they are forecasts. Thus, the available powers or power reductions and the associated costs are provided by time bracket for a full day.

Additionally, an optional forecast file 81 containing these anticipated values is sent to the grid manager 62. The forecast file 81, limited to the high scenario for example, assumes, in a diagrammatic and partial illustration, the following form:

|  | Available power | 0 h-2 h | 2 h-4 h | 4 h-6 h | 6 h-8 h | 8 h-10 h | 10 h-12 h | 12 h-14 h | 14 h-16 h | 16 h-18 h | 18 h-20 h | 20 h-22 h | 22 h-24 h |
|---|---|---|---|---|---|---|---|---|---|---|---|---|---|
| Global | Available power (MW) | 132 | 161 | 167 | 197 | 168 | 183 | 213 | 189 | 217 | 222 | 195 | 195 |
|  | €/MWh | 154 | 153 | 153 | 150 | 150 | 150 | 147 | 130 | 133 | 130 | 130 | 130 |
| Zone 40A | Available power (MW) | 70 | 70 | 70 | 100 | 100 | 100 | 130 | 121 | 120 | 110 | 90 | 90 |
|  | €/MWh | 184 | 184 | 184 | 170 | 164 | 164 | 161 | 162 | 130 | 130 | 128 | 128 |
| Zone 40B | Available power (MW) | 23 | 52 | 52 | 52 | 23 | 23 | 23 | 23 | 52 | 52 | 45 | 45 |
|  | €/MWh | 110 | 132 | 132 | 132 | 110 | 110 | 110 | 110 | 132 | 132 | 120 | 120 |
| Zone 40C | Available power (MW) | 39 | 39 | 45 | 45 | 45 | 60 | 60 | 45 | 45 | 60 | 60 | 60 |
|  | €/MWh | 125 | 125 | 127 | 127 | 127 | 141 | 141 | 127 | 127 | 141 | 141 | 141 |

The forecast file 81 is globally similar to the decision file 77 previously shown for the real-time values, but comprises available powers for each time bracket of a day. These are anticipated available powers.

The invention described above has multiple advantages, and in particular makes it possible to guarantee the grid manager a power reserve, in the form of a power reduction for certain preselected consumers. This power reserve is guaranteed and available at a reduced cost, since it is computed relative to a real instantaneous consumption. Additionally, since the grid manager is not required to perform any computation, the power reduction can be activated more quickly. More specifically, the power reserve corresponding to this power reduction is available very quickly, for example in a time frame of less than 1 minute, preferably less than 30 seconds or 5 seconds, i.e., quasi-instantaneously. This invention therefore makes it possible to respond to an emergency situation and an unanticipated imbalance between consumption and production on the grid 10. Furthermore, the invention makes it possible to target the power reduction geographically, and to select certain consumers from among the preselected consumers for whom the power reduction causes a low remuneration cost. Lastly, being able to group a larger or smaller number of preselected consumers 42, 44, 46, 48, 50, 52 together for a given geographic zone 40A, 40B, 40C during the activation step 104c makes it possible to broaden the number of potential candidate consumers able to contract with the control entity 60. Furthermore, consumers whose availability range does not meet the grid manager's requirements can now participate in the power reduction mechanism by being grouped together with other consumers.

The control entity 60 allows the processing and regulation of the consumption on the electric grid to be automated.

According to one alternative, each geographic zone 40A, 40B, 40C is broken into several sectors. This alternative exists where the power reduction level and the number of consumers is high in a same geographic zone.

The invention claimed is:

1. A method for regulating power consumed on an electric grid, the electric grid being able to supply a plurality of consumers with electric current, preselected consumers being able to accept a predetermined decrease in power over a predetermined time range, the method comprising the following steps:

transmitting to a first receiving unit of a control entity, regularly and by each preselected consumer, a message containing consumed power of said preselected consumer, a duration between two successive message transmissions for a given consumer being less than 1 hour, computing, by a computation member of the control entity, a maximum power reduction value for all of the preselected consumers and a maximum duration of that power reduction, said maximum power reduction value being computed based on the received consumed power of each preselected consumer, transmitting, by a transmission unit of the control entity, to a grid manager, the maximum power reduction value and the maximum duration for the computed power reductions, and sending, by the grid manager to a second receiving unit of the control entity, a command order for a commanded power reduction for a selected length of time, a value of the commanded power reduction being less than or equal to the computed maximum power reduction value and the selected length being less than or equal to the computed maximum duration of the power reduction.

2. The method according to claim 1, wherein
the control entity is separate from the grid manager, and the control entity is configured to communicate with the grid manager via the Internet.

3. The method according to claim 1, wherein
during the computing step, the control entity computes a minimum power reduction duration,
during the transmitting step by the transmission unit, said minimum power reduction duration is transmitted to the grid manager, and
during the sending step, the selected length is comprised between a computed minimum duration of the power reduction and the computed maximum duration of the power reduction.

4. The method according to claim 1, wherein, during the transmitting step to the first receiving unit, the transmitted consumed power is an instantaneous or averaged power.

5. The method according to claim 1, wherein
the command order for the commanded power reduction is carried out by the control entity as of receipt of the command order, and
a time frame between the sending of the command order and the power reduction for the preselected consumers is less than 1 minutes.

6. The method according to claim 5, wherein the time frame between the sending of the command order and the power reduction for the preselected consumers is less than 30 seconds.

7. The method according to claim 6, wherein the time frame between the sending of the command order and the power reduction for the preselected consumers is less than 5 seconds.

8. The method according to claim 1, wherein
the electric grid is configured to power a plurality of distinct geographic zones,
the preselected consumers are grouped together by geographic zone,
during the computing step, the maximum power reduction value and the maximum duration of the power reduction are computed by each of the geographic zones, and
during the sending step, the command order of the commanded power reduction is specific to one or more of the geographic zones.

9. The method according to claim 8, wherein, during the computing step, the control entity carries out the following steps:

a) processing the messages transmitted by each preselected consumer,
b) verifying that a power reduction offered by the preselected consumers is greater than or equal to a predetermined power reduction value for each geographic zone,
c) activating an alert signal on a terminal of the control entity and increasing a number of preselected consumers for a given geographic zone if the power reduction offered by the consumers previously preselected for said geographic zone is less than the predetermined power reduction value, then returning to the verifying step, and
d) generating a decision file comprising the computed maximum power reduction value and the computed maximum duration.

10. The method according to claim 9, wherein, during the processing of the messages transmitted by each preselected consumer, the control entity computes, for each preselected consumer, a power reduction and a duration of that power reduction, based on the consumed power and the following parameters:

a value of a predetermined power decrease,
a maximum number of power reductions authorized over a predetermined time period,
a number of power reductions done since a beginning of a predetermined time period,
a minimum time frame between two successive power reductions,
a predetermined time range for the power reduction,
a minimum time frame for implementing the power reduction, and
a consumer's availability schedule.

11. The method according to claim 1, wherein
each preselected consumer comprises one or more sub-consumers,
during the transmitting step to the first receiving unit, the consumed power transmitted, via the message, by each preselected consumer is equal to a sum of power consumed by the corresponding one or more sub-consumers, and
the message also comprises power consumed by each of the one or more sub-consumers.

12. The method according to claim 11, wherein
during the computing step, the control entity computes, for each preselected consumer, several power reduction values during a maximum duration, the computed power reduction values being equal to respective percentages of the maximum power reduction value and corresponding to power reductions consumed by each of the one or more sub-consumers or groups of the one or more sub-consumers;
during the transmitting step by the transmission unit, the control entity transmits the computed several power reduction values and corresponding maximum durations; and
during the sending step, a value of the commanded power reduction is equal to one of the several power reduction values transmitted by the control entity.

13. The method according to claim 1, wherein, during the computing step, a time frame to compute the maximum power reduction value and the maximum duration, as of the reception of the consumed power, transmitted by each preselected consumer, is less than 1 minute.

14. The method according to claim 1, wherein
the computed maximum power reduction value is an anticipated maximum power reduction value and the computed maximum duration is an anticipated maximum duration,
the anticipated maximum power reduction value and the anticipated maximum duration are transmitted to the grid manager daily, and
the anticipated maximum power reduction value and the anticipated maximum duration correspond to forecasts, for a predetermined period of the maximum power reduction value and for a maximum length of time.

15. The method according to claim 14, wherein the predetermined period is a following day.

16. The method according to claim 1, wherein the duration between two successive message transmissions for the given consumer is less than 10 minutes.

17. The method according to claim 16, wherein the duration between two successive message transmissions for the given consumer is less than 1 minute.

* * * * *